(12) United States Patent
Ahrns et al.

(10) Patent No.: US 9,857,178 B2
(45) Date of Patent: Jan. 2, 2018

(54) METHOD FOR POSITION AND LOCATION DETECTION BY MEANS OF VIRTUAL REFERENCE IMAGES

(71) Applicant: Airbus DS GmbH, Taufkirchen (DE)

(72) Inventors: Ingo Ahrns, Bremen (DE); Christoph Haskamp, Bremen (DE)

(73) Assignee: Airbus DS GmbH, Taufkirchen (DE)

( * ) Notice: Subject to any disclaimer, the term of this patent is extended or adjusted under 35 U.S.C. 154(b) by 136 days.

(21) Appl. No.: 14/638,128

(22) Filed: Mar. 4, 2015

(65) Prior Publication Data
US 2015/0253140 A1    Sep. 10, 2015

(30) Foreign Application Priority Data
Mar. 5, 2014    (DE) .......................... 10 2014 003 284

(51) Int. Cl.
*H04N 7/00*    (2011.01)
*H04N 7/18*    (2006.01)
(Continued)

(52) U.S. Cl.
CPC ............. *G01C 21/00* (2013.01); *G01C 21/20* (2013.01); *G06K 9/0063* (2013.01); *G06T 7/75* (2017.01);
(Continued)

(58) Field of Classification Search
CPC .................................................... G01C 21/00
(Continued)

(56) References Cited

U.S. PATENT DOCUMENTS 3,784,968 A    1/1974  Brosow
5,136,297 A    8/1992  Lux et al.
(Continued)

FOREIGN PATENT DOCUMENTS

AU    29242/89    8/1989
DE    2 126 688   1/1972
(Continued)

OTHER PUBLICATIONS

Tatsuaki Hashimoto, "The Solar System and Image Processing", Institute of Image Information and Television Engineers, ITE Journal, Jun. 1, 2010, vol. 64 No. 6, pp. 789 to 793, ISSN 1342-1607, with partial English translation.
(Continued)

*Primary Examiner* — Hung Dang
*Assistant Examiner* — Girumsew Wendmagegn
(74) *Attorney, Agent, or Firm* — W. F. Fasse

(57) ABSTRACT

A method describes the architecture of a vision-supported navigation system in a terrain using available topographical maps, which is based on already existing methods for detecting prominent terrain features. An offline process used in this case creates a feature database from existing topographical maps, which is subsequently used in an online process for recognizing features that have been seen. In this case, virtual reference images of the expected situation are created using computer graphical methods, which are analyzed using methods for feature extraction, and a feature catalog made up of vision-based feature vectors and the associated 3D coordinates of the localized features is derived from the same. These data are stored in a flight system in the form of a model database, for example, and enable navigation close to a reference trajectory and for a planned lighting situation. High localization characteristics and a correspondingly high navigation accuracy are
(Continued)

achieved by means of the possibility of using any desired, not necessarily lighting-invariant, feature extractors.

6 Claims, 5 Drawing Sheets

(51) Int. Cl.
    *G01C 21/00* (2006.01)
    *G01C 21/20* (2006.01)
    *H04N 5/225* (2006.01)
    *G06K 9/00* (2006.01)
    *G06T 7/73* (2017.01)

(52) U.S. Cl.
    CPC ... *H04N 5/225* (2013.01); *G06T 2207/10032* (2013.01); *G06T 2207/30252* (2013.01)

(58) Field of Classification Search
    USPC .......................................................... 348/116
    See application file for complete search history.

(56) References Cited

U.S. PATENT DOCUMENTS

| | | |
|---|---|---|
| 2009/0048780 A1 | 2/2009 | Caballero et al. |
| 2011/0026832 A1 | 2/2011 | LeMoigne-Stewart et al. |
| 2013/0230214 A1 | 9/2013 | Arth et al. |
| 2014/0340427 A1* | 11/2014 | Baker ................. G06T 3/0062 345/641 |

FOREIGN PATENT DOCUMENTS

| | | |
|---|---|---|
| DE | 31 10 691 | 10/1982 |
| DE | 39 39 731 | 6/1991 |
| DE | 195 21 600 | 12/1996 |
| DE | 102009036518 | 2/2011 |
| DE | 102010051561 | 5/2012 |
| DE | 102008064712 | 2/2013 |
| EP | 2 687 817 | 1/2014 |
| GB | 2 302 318 | 1/1997 |
| JP | 06-251126 A | 9/1994 |
| RU | 2 044 273 | 9/1995 |
| RU | 2 353 902 | 4/2009 |
| RU | 2 375 756 | 12/2009 |
| WO | WO 2006/132522 | 12/2006 |

OTHER PUBLICATIONS

English translation of Russian Search Report for Russian Patent Application No. 2015107561/08, search completed Mar. 24, 2015, 2 pages, Moscow, Russia.

Raj Talluri et al., "Image/Map Correspondence for Mobile Robot Self-Location Using Computer Graphics", IEEE Transactions on Pattern Analysis and Machine Intelligence, IEEE Computer Society, USA, vol. 15, No. 6; Jun. 1993, pp. 597 to 601.

Marco Mammarella et al., "Advanced Optical Terrain Absolute Navigation for Pinpoint Lunar Landing", Advances in Aerospace Guidance Navigation and Control, 2011, pp. 419 to 430.

Bach Van Pham et al., "Vision-Based Absolute Navigation for Descent and Landing", Journal of Field Robotics, vol. 29, Issue 4, Jul. 2012, pp. 627 to 647.

David G. Lowe, "Distinctive Image Features from Scale-Invariant Keypoints", International Journal of Computer Vision, vol. 60, No. 2, Jan. 2004, pp. 91 to 110.

Jeff Delaune et al., "Optical Terrain Navigation for Pinpoint Landing: Image Scale and Position-Guided Landmark Matching", Advances in the Astronautical Sciences, vol. 144, 2012, pp. 627-643.

Olivier Dubois-Matra et al., "Testing and Validation of Planetary Vision Based Navigation Systems with Pangu", The Proceedings of the $21^{st}$ International Symposium on Space Flight Dynamics (ISSFD), 2009.

Jeff Delaune, "Navigation Visuelle Pour L'atterrissage Planetaire de Précision Indépendante du Relief", "Vision-Based Navigation for Pinpoint Planetary Landing on Any Relief", Doctoral Thesis, Institut Supérieur de l'Aéronautique et de l'Espace (ISAE), Toulouse, France, Jul. 2013 (in English).

Doug Reid, "A Real Time Implementation of a Passive Optical Terrain Navigation System", $59^{th}$ International Astronautical Congress 2008, Sep. 29, 2008, vol. 8, pp. 4923 to 4935, XP008176920.

European Examiner Frank Hoekstra, European Search Report for European Patent Application No. EP 15 15 7533, dated Jul. 8, 2015, 2 pages, The Hague, Netherlands, with English translation, 2 pages.

European Examiner Patrick Pascheka, European Office Action in European Patent Application No. 15 157 533.9, dated Apr. 4, 2017, 7 pages, with partial English translation, 3 pages.

European Office Action in European Patent Application No. 15 157 533.9, dated Aug. 19, 2016, 4 pages, with partial English translation, 2 pages.

* cited by examiner

METHOD FOR POSITION AND LOCATION DETECTION BY MEANS OF VIRTUAL REFERENCE IMAGES

FIELD OF THE INVENTION

The invention relates to methods for the position and location detection of a camera with respect to a topographical map by means of virtual reference images.

BACKGROUND INFORMATION

For the exploration of extreme environments, for example other planets or also deep-ocean regions, autonomously acting vehicles are increasingly being used, which must localise themselves in their environment, in order to be able to reach a pre-planned target location. One possibility in this case consists in a method of the previously mentioned type, which is based on a camera-based navigation on the basis of existing topographical maps. Topographical maps of this type also exist for regions that hitherto have not been satisfactorily explored, such as for example the seabed of the deep ocean or planetary surfaces, such as that of the moon and Mars. For the moon and Mars in particular, detailed topographical maps of the entire moon and also for Mars, which contain both photographs and elevation relief and were obtained by means of stereo or laser distance measurements, exist owing to the cartographic missions of the American and Japanese space agencies NASA and JAXA, which were carried out in the past. The quality of the map material is very high and goes down to a resolution of a few meters for regions such as the polar regions of the moon in particular.

A landing vehicle, which should land precisely at a predetermined location, must observe its position and its location constantly during the landing process, in order to be able to correct deviations from a planned path. As there are no current navigation systems outside of the Earth, the navigation must take place in some other manner. For a desired precision of a few hundred meters, a navigation by means of RADAR systems is not possible from the Earth, and a vision-supported navigation on the basis of known features on the planet surface is the only remaining option. In this case, during the imaging of a planetary surface with the aid of a camera, the challenge lies in extracting and recognising features, the spatial locations of which are known with reference to a reference system. The position and location of the camera system with respect to the reference system can then be determined from the correspondence of two-dimensional locations in the camera image and three-dimensional locations in the reference system.

A fundamental principle of already-known methods for navigation on the basis of maps consists in the fact that images of the terrain that is flown over are taken with the aid of a camera system and that visual features are extracted on the basis of the recorded camera images, which features can be recognised in the map material available for the terrain. The particular position and location can be determined from the assignment of the two-dimensional position of the extracted features in the camera image and the 3D coordinates of the recognised features in the map material to one another. In the case of space vehicles it has to this end already been suggested to limit oneself to a determination of the position thereof, as the location thereof can be measured more precisely with the aid of star cameras. Differences between the various known methods consist principally in the choice of features, which are extracted from camera images and which are to be recognised in the map material.

A method developed essentially for navigation on the moon surface, which is described in the article "Advanced Optical Terrain Absolute Navigation for Pinpoint Lunar Landing" by M. Mammarella, M. A. Rodrigalvarez, A. Pizzichini and A. M. Sanchez Montero in "Advances in Aerospace Guidance Navigation and Control", 2011, on pages 419-430, is based on the recognition of craters. Here, the camera image is investigated using a specifically developed image-processing operator with regards to patterns in the image of elliptical appearance and provided with characteristic shadow casting, and the craters are extracted in the image. At the same time, craters are detected in topographical maps, what are known as digital elevation maps (DEM), of the lunar surface and the 3D coordinates thereof are stored in the lunar coordinates. The assignment of craters of the map to craters detected in the camera image takes place subsequently essentially by means of an analysis of the crater constellation. By recognising craters in different lighting conditions, a topographical map is then sufficient for achieving the navigation task.

In a method termed "LandStel", which is described inter alia in the article "Vision-Based Absolute Navigation for Descent and Landing" by B. Van Pham, S. Lacroix and M. Devy in "Journal of Field Robotics", pages 627-647, Volume 29, Issue 4, July 2012, it is not crater recognition, but rather a detector of prominent points in the camera image, which is also termed a Harris operator, that is used. In order to be scale-invariant, height information, for example from an altimeter, is used. The Harris features are then calculated within a scaled image, from which a scaling invariance emerges, without requiring the calculation outlay of a so-called SIFT operator, as is described in the article "Distinctive Image Features from Scale-Invariant Keypoints" by David G. Lowe in the journal "International Journal of Computer Vision", Volume 60, No 2, pages 91-110, 2004. In this known method, constellations of Harris features that are transformed into a rotation-invariant feature vector, are termed features. These feature vectors are subsequently used for recognising features between the map and the current camera image. In this case, the map contains a photo of the terrain and also a topographical map, in order to determine the 3D coordinates of the corresponding features.

In a further known method, the features are detected with the aid of what is known as the SIFT feature operator and features are likewise compared between photography and the current camera image. The 3D data are taken from a topographical map in this case. In a different known method, small image details around certain points are extracted, which should be recognised by means of correlation operators in maps of the terrain.

In addition to these image-based approaches, methods have also already become known, which suggest depth data for navigation purposes and which are based on the data of a LIDAR (Light Detection and Ranging).

Common to the image-based approaches is the fact that either an attempt is made to develop lighting-independent operators, as are claimed by the crater-based approach, except that maps are used, which already have similar lighting conditions as the images, which are to be expected for navigation.

In addition, concrete methods have also already become known for landing on heavenly bodies. Thus, DE 10 2010 051 561 A1 describes a system for automated landing of unmanned flying objects, which pre-assumes the existence of a ground unit. DE 10 2009 036 518 A1 is concerned with carrying out the landing procedure of a space-travel flying object and in the process describes the actuatorics required for the landing procedure. Furthermore, DE 10 2008 064 712 B4 is concerned with a sensor-assisted landing assistance apparatus between helicopters and a landing platform. DE 195 21 600 A1 suggests an image-assisted navigation system for automatic landing, which is based on equipping the landing area with artificial markers. DE 39 39 731 C2 also assumes that the landing area is equipped with helping markers and additionally suggests using planar depth sensors, such as laser scanners or RADAR. Finally, DE 21 26 688 A also suggests the use of visible markers in a ground station. Only in DE 31 10 691 C2 is a navigation system for a cruise missile presented, which receives pulse trains on the basis of available map materials and an active sensor, for example a laser measuring beam that acquires distance and intensity, present on the flying object and compares these pulse trains with pulse trains, which are created from aerial images manually or automatically. Furthermore, it is suggested there to use a plurality of measuring beams.

SUMMARY OF THE INVENTION

It is an object of at least one embodiment of the invention to design a method of the type mentioned at the beginning in such a manner that it enables a sight-based navigation and the use of computer graphical methods for creating a reference database, which makes it possible to even use a feature extractor if the same is not lighting independent or is not sufficiently robust when subject to lighting variation.

The above object can be achieved according to at least one embodiment of the invention in a method, which creates a feature database in an off-line process from existing topographical maps and which subsequently uses the same in an online process for recognising features that have been seen. To this end, virtual reference images of an expected (e.g. predicted or prognosticated) situation are preferably created using computer graphical methods, which are analysed by means of feature extraction, and a feature catalogue made up of vision-based feature vectors and the associated 3D coordinates of the localised features is derived from the same. These data are stored in a flight system in the form of a model database, and navigation then takes place close to a reference trajectory for a planned lighting situation.

The use of complete images and passive sensors, such as a camera, and the techniques for feature extraction that are used in the invention are neither explained in the published document DE 31 10 691 C2, nor are they known from any of the other previously discussed methods.

In this case, the invention makes use of the fact that, for many possible use cases, such as for example for a planetary landing process, location and time of the planned overflight are known. If, in addition, a precise topographical map of the overflight area is known, then computer-graphically generated expectations of what the camera is expected to image can be calculated with the aid of the method according to the invention by means of computer-graphical methods on the basis of the map material and with knowledge of the planned overflight trajectory and also the planned overflight time. In this manner, it is possible using the method according to the invention in the preparation of the overflight to calculate a virtual image sequence, for which in addition, for each pixel in the image, a corresponding 3D coordinate in the reference coordinate system is saved.

The pre-calculation of an expected image sequence in this case constitutes an off-line process, which is used for the building, which is provided according to the invention, of a feature catalogue, which is used for navigation during the actual overflight. The basic idea of the method according to the invention therefore consists in dividing up the entire process in such a manner that initially a feature database is created and that the feature database thus created in advance is then used during flying operation in an online application. Although the method according to the invention uses methods of already existing methods, its innovation consists in using a multiplicity of already existing feature extractors, which have the inherent disadvantage of not being lighting invariant, by using computer-graphical methods for preparing and processing the map material. Only the method according to the invention enables a use of already established and to some extent very robust methods for feature extraction and feature recognition. This has the advantage compared to crater detection for example for the use case of a moon landing, that actually pinpoint features are used, which can be localised very well in the image and in the map and therefore offer a clear increase in achievable precision compared to a crater-based approach. The lower achievable precision of a crater-based approach stems principally from the circumstance that a crater is not a regular body with sharply outlined structures and therefore even the position thereof in relation to the available map material can only be defined approximately. Additionally, in crater-based methods, a change of the lighting conditions leads to a slight displacement of the detected crater position, so that the method realised using the present invention would also be advantageous for crater-based methods.

BRIEF DESCRIPTION OF THE DRAWINGS

The method according to the invention shall be explained in more detail in the following on the basis of the drawing. In the figures

DETAILED DESCRIPTION OF EXAMPLE EMBODIMENTS OF THE INVENTION

Figure 1:
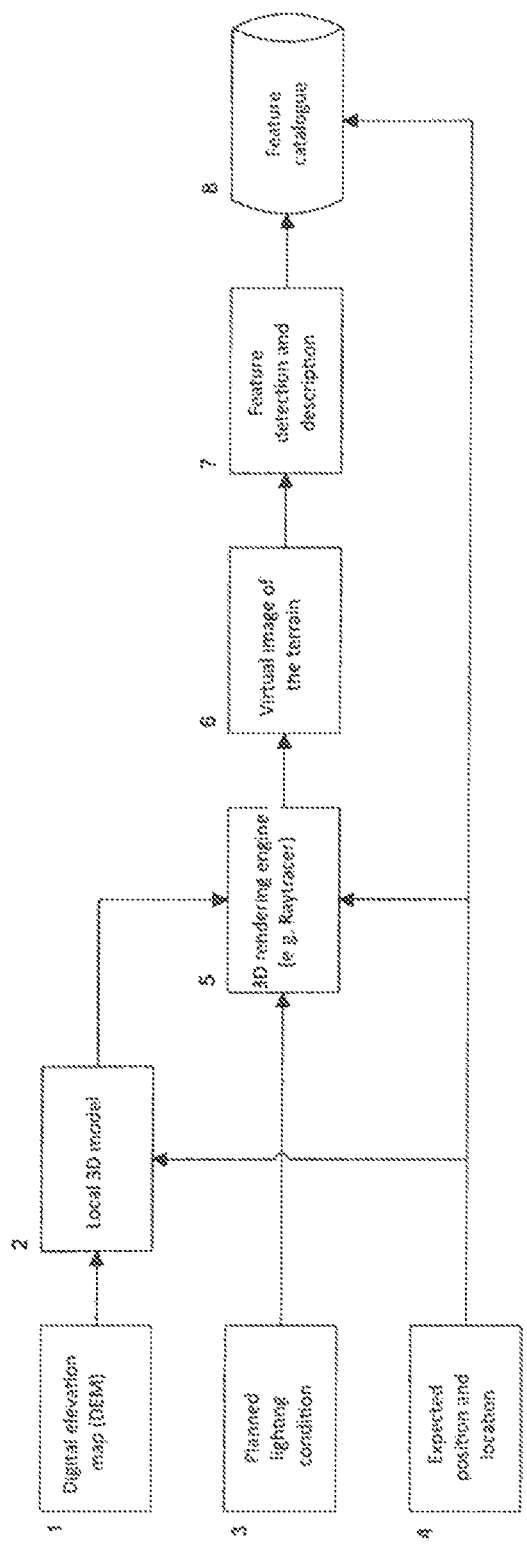
FIG. 1 shows the principal procedure of the offline process for creating a feature database.

The feature generation with the aid of computer-graphical methods illustrated in FIG. 1 consists in initially creating a local model 2, which contains only those map details that are seen by the camera for a prognosticated camera position and location, on the basis of a terrain model 1, for example a digital elevation map (DEM), of the entire overflight area. Depending on the inaccuracies to be expected with regards to the position and the location during the take-off of the planned trajectory, the local model is enlarged slightly in order to take account of the expected inaccuracies. A planned time with an associated lighting condition 3, for example the position of the sun, the position of a planet or the moon, etc., is assumed for the planned trajectory. A virtual image 6 of the expected situation is then created with the aid of computer-graphical technologies 5 that are known per se, for example what is known as ray tracing, from the local model and the expected position 4 and the location of the camera with respect to the local model 2 and the planned lighting condition 3.

This creation of a local model can therefore be necessary when the entire area to be overflown possibly contains too large a data quantity. For a specific camera position and location, the local model is initially represented as a 3D model 2 and, if present, provided with what is known as an Albedo map, which represents the reflection properties of the surface. In this case, any errors present in the map are to be corrected and gaps are to be interpolated.

A local map is then created on the basis of the original map material. This relates to digital elevation maps, the grey values of which correspond to different heights. In this local model, one camera can virtually be placed at an expected position and a virtual image, and also a virtual depth map, can be created therefrom.

The match can be so similar, depending on the available map material, that image features 7, which have been calculated in the virtual image 6, can effortlessly be recognised in the real camera image. These features are stored in a database 8 and consist of a feature vector (as a function of the feature extractor used), and also the associated 3D coordinates in the reference system (for example moon coordinates).

Figure 2:
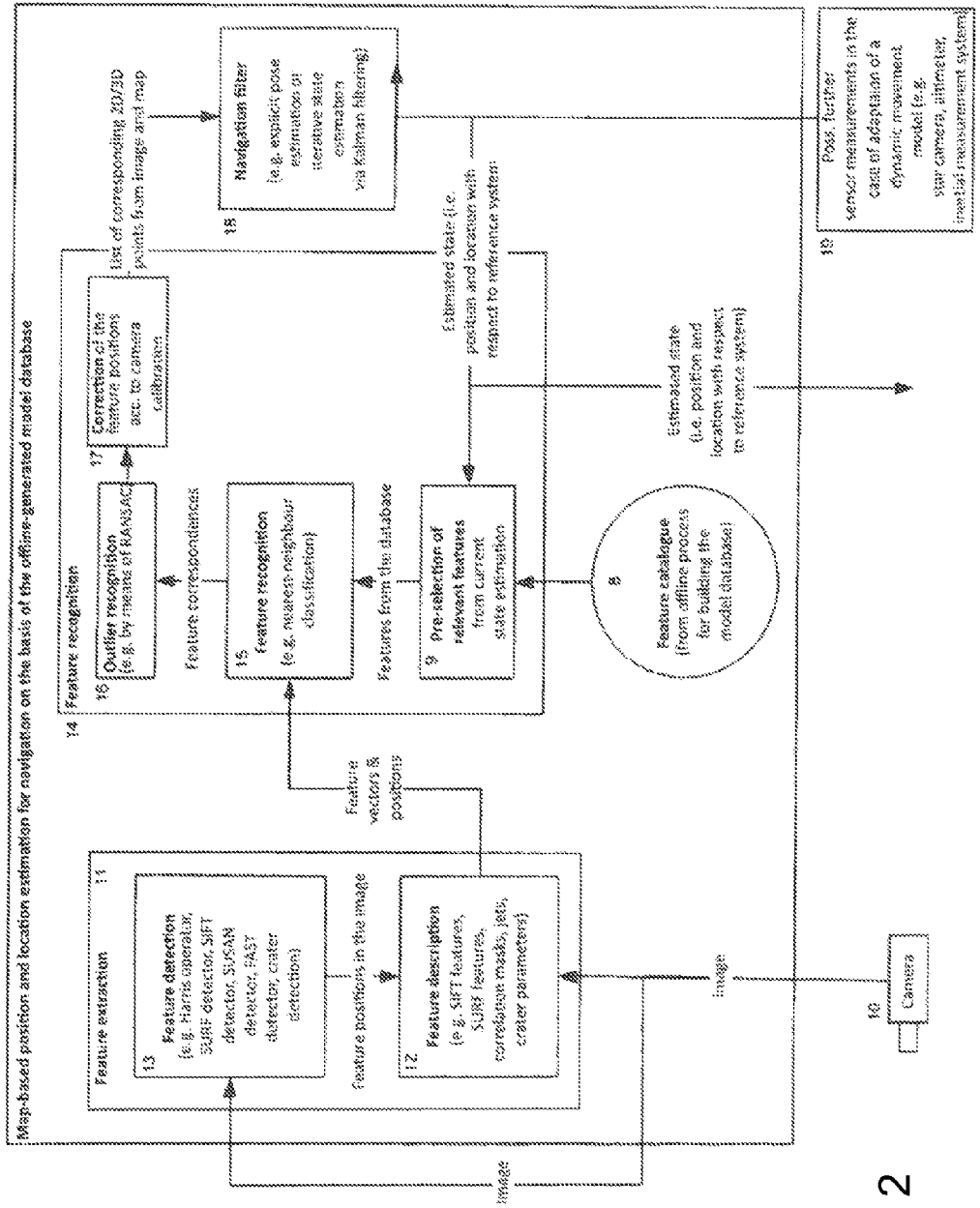
FIG. 2 shows the principal procedure of the online process for position and location detection of a camera with respect to a reference map.

FIG. 2 describes how, on the basis of the thus-obtained feature database 8, a position and location determination of a camera 10 can be carried out during the overflight of a mapped terrain. In this case, the camera 10 records digital image data in a fixed cycle, which are analysed by a processing unit 11: A feature extractor 12 detects prominent features in the image, which can contain any form of a feature extractor, such as for example SURF, SIFT, Harris, SUSAN, FAST or else more complex structures, such as craters or LandStel features. Feature vectors, i.e. local descriptions of the locations on the basis of grey-value information, are likewise detected 13 at the locations of the detected features from the digital image and passed to the recognition stage 14 linked with the 2D locations of the detected points in the image. The feature recognition 15 accepts a series of features of the feature database 8 via a pre-selection of relevant features 9 and attempts to produce an assignment between the features found in the image and the features stored in the database 8. To this end, the feature vectors are used first, which can be recognised by means of nearest-neighbour classifiers for example. The result is an assignment of features in the image and the database 8 to which the 3D coordinates of the map are attached. In the next stage 16, any possible errors, what are known as outliers, of the undertaken assignment are checked and removed. This can be undertaken for example by means of known methods, such as RANSAC filtering for example. Finally, the 2D coordinates of the features that have been found are corrected in accordance with an intrinsic camera calibration 17 that is available for the camera 10, so that at the end of this processing stage 14, a list of corresponding 2D and 3D points is present.

For feature recognition, for the sake of simplicity, not all of the features present in the feature database 8 are compared with those found in the images, rather only those features are selected, which may come into question after taking account of the position and location estimation carried out previously. Thus, a large number of features that are not visible at all can already be excluded in advance, as they belong to map areas that are too far away. The lists of corresponding 2D locations from the current camera image and 3D coordinates from the digital elevation maps then allow the position and location of the camera system 10 to be detected 18 with respect to the reference map in two ways. Either by means of an optimisation method, which determines the camera position and the location directly, or else an iterative so-called Kalman filter is used, which offers the advantage of being able to take yet further measurements of other sensors 19 into account. For preselecting 9 the relevant features in the next time cycle from the feature database 8, the thus-obtained position and location information is either used directly or an initialisation is predefined externally.

Figure 3:
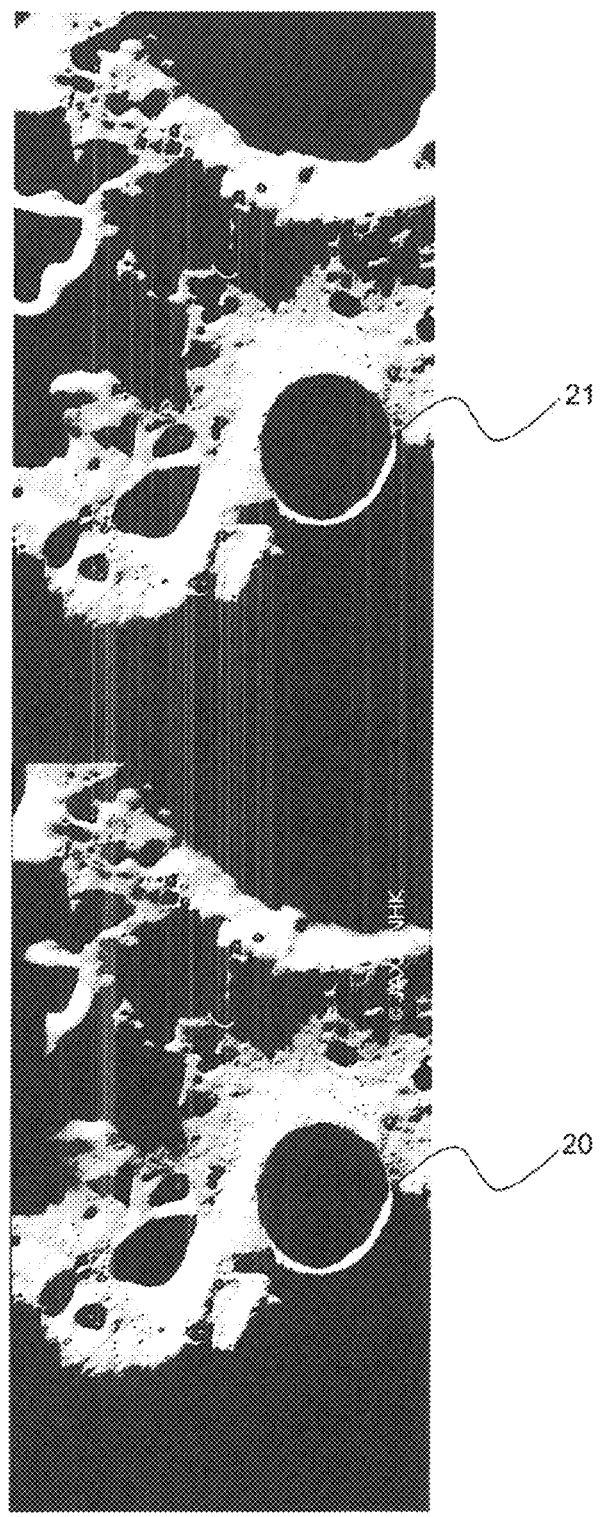
FIG. 3 shows the assignment of features between a virtual image and a real image.

FIG. 3 shows an example of the recognition of features between a real camera image of a moon crater 20, illustrated in the image portion on the left, and an artificially generated image of the same moon crater 21 in the image portion on the right. In this image pair, the SURF feature detector was used, which is rotation and scale-invariant, i.e. under rotation and scaling of the image, the same feature vectors are nonetheless detected. However, this extractor is not independent of the lighting conditions. The fact that this operator can be used in spite of this is down to the fact that according to the invention, a model database is generated with the aid of computer-graphical methods, which anticipate the predicted lighting conditions and input the'same into the features database as well. As a result, it is possible in principle to use any desired feature extractor!

Figure 4:
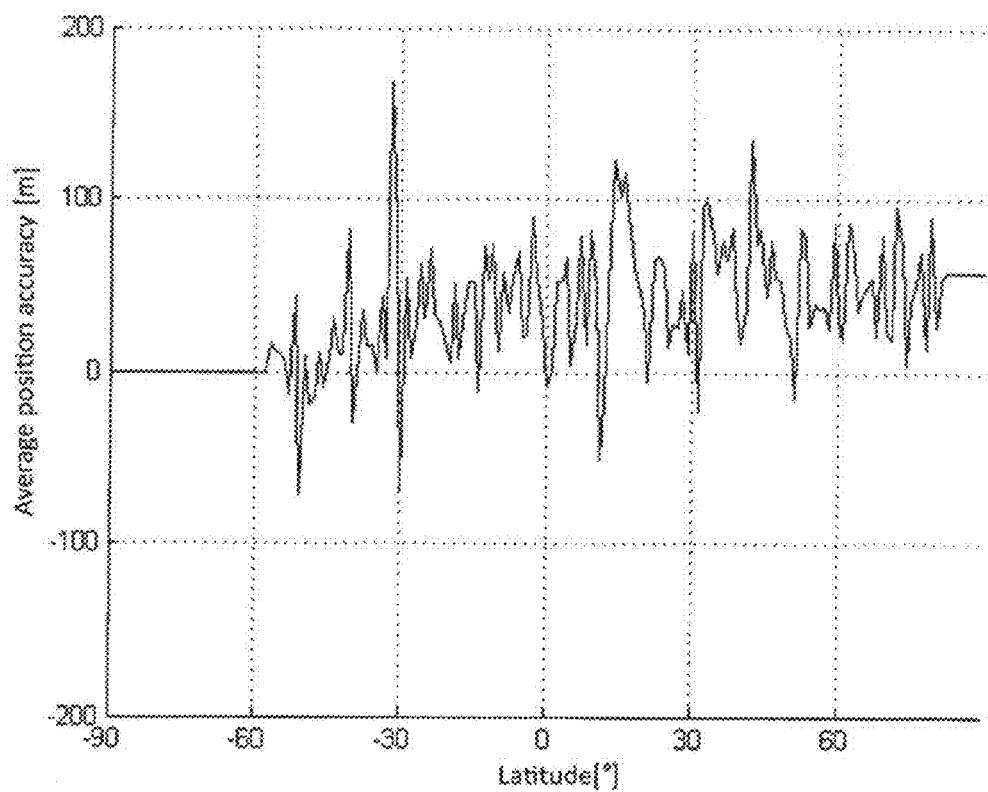
FIG. 4 shows the average position accuracy as a result of a simulated test landing of 100 km to 5 km height on the basis of real images of a robotic test unit.
Figure 5:
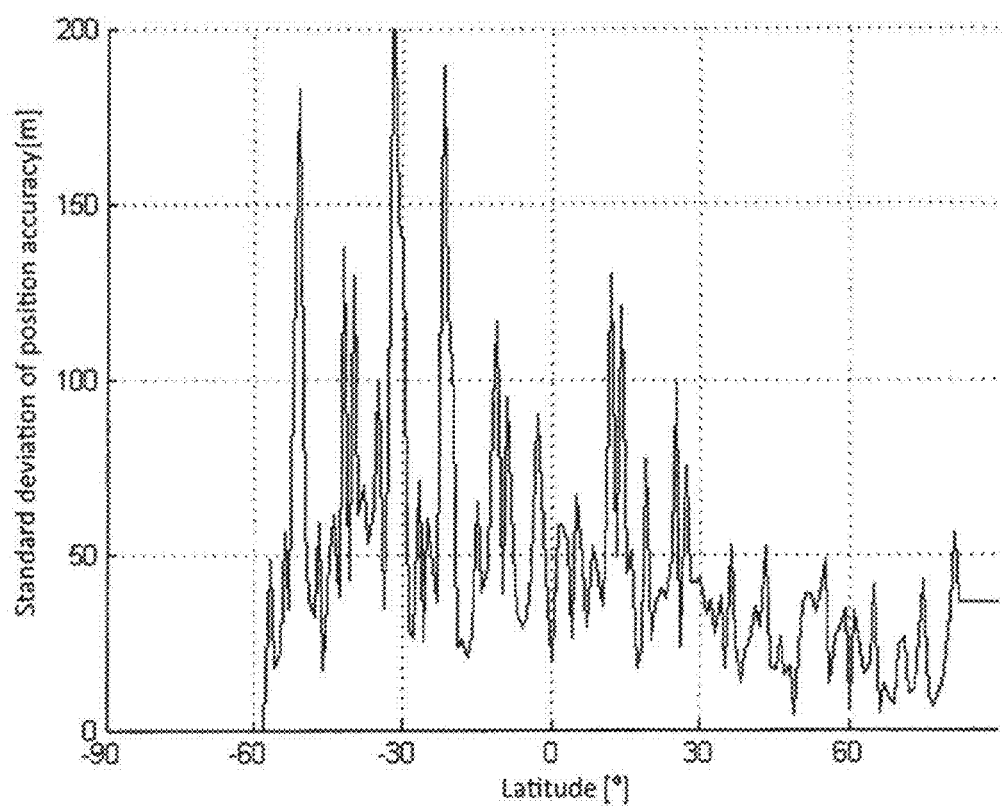
FIG. 5 shows the standard deviation of the positioning images of a simulated test landing of 100 km to 5 km height on the basis of real images of a robotic test unit.

Finally, FIGS. 4 and 5 illustrate how the method was tried and tested on the basis of the trajectories for a simulated moon landing. In this case, both a pure simulation and comparisons between real and virtual images were used. The curves illustrated in FIGS. 4 and 5 show the accuracies achieved for a descent of a simulated lunar module from approx. 100 km height to approx. 5 km height. FIGS. 4 and 5 illustrate the average positioning accuracies achieved in the test and the associated standard deviations in each case. These tests with real camera image sequences were carried out in a robotic test unit before a model of a moon surface at a scale of 1:50000.

The invention claimed is:

1. A method of detecting a position and a location of a camera with respect to a topographical map, comprising the steps:
   a) obtaining existing topographical map data;
   b) obtaining a predicted camera position and location that a camera is predicted to have during a planned trajectory;
   c) producing a local 3D model from the existing topographical map data, wherein the local 3D model contains only such localized map features of the existing topographical map data that would be imaged by the camera at the predicted camera position and location;
   d) producing a virtual image from the local 3D model;
   e) in an off-line process, producing a feature database from the virtual image; and
   f) in an online process, using the feature database to recognize actual features that have been imaged by the camera during an actual trajectory.

2. The method according to claim 1, wherein at least the step f) is carried out on-board a flight system, which flies along the actual trajectory.

3. The method according to claim 1, wherein the step d) further comprises producing a sequence of a plurality of the virtual images, which further involves storing a respective corresponding 3D coordinate in a reference coordinate system for each pixel of each one of the virtual images.

4. The method according to claim 1, wherein the step d) comprises producing the virtual image with a computer-graphical method based on the local 3D model evaluated for an expected situation, and wherein the step e) comprises analyzing the virtual image by feature extraction to produce the feature database containing vision-based feature vectors and associated 3D coordinates of localized features of the virtual image based on the localized map features.

5. The method according to claim 4, wherein the expected situation comprises a predicted lighting situation that is predicted to exist at the predicted camera position and location on the planned trajectory.

6. The method according to claim 1, wherein the feature database is stored in a flight system, and further comprising navigating the flight system along the actual trajectory to follow closely along the planned trajectory.

* * * * *